(12) United States Patent
Muerset

(10) Patent No.: US 12,710,439 B2
(45) Date of Patent: Aug. 18, 2026

(54) DEAD VOLUME REDUCTION AND METHOD THEREFOR

(71) Applicant: TECAN TRADING AG, Männedorf (CH)

(72) Inventor: Peter Muerset, Boulder Creek, CA (US)

(73) Assignee: TECAN TRADING AG, Männedorf (CH)

( * ) Notice: Subject to any disclaimer, the term of this patent is extended or adjusted under 35 U.S.C. 154(b) by 557 days.

(21) Appl. No.: 18/267,839

(22) PCT Filed: Dec. 21, 2020

(86) PCT No.: PCT/US2020/066423
§ 371 (c)(1),
(2) Date: Jun. 16, 2023

(87) PCT Pub. No.: WO2022/139793
PCT Pub. Date: Jun. 30, 2022

(65) Prior Publication Data
US 2024/0110936 A1 Apr. 4, 2024

(51) Int. Cl.
*G01N 35/10* (2006.01)
*G01N 35/00* (2006.01)

(52) U.S. Cl.
CPC ... *G01N 35/1016* (2013.01); *G01N 35/00623* (2013.01); *G01N 2035/1025* (2013.01)

(58) Field of Classification Search
None
See application file for complete search history.

(56) References Cited

U.S. PATENT DOCUMENTS 6,270,726 B1 8/2001 Tyberg et al.
2015/0268230 A1 9/2015 Endo

FOREIGN PATENT DOCUMENTS

EP 3336557 A1 6/2018
EP 3614151 A1 2/2020
WO WO-9508774 A2 * 3/1995 .............. B01F 31/24

OTHER PUBLICATIONS

International Search Report and Written Opinion for PCT/US2020/066423 dated Oct. 12, 2021.

* cited by examiner

*Primary Examiner* — Kathryn Elizabeth Limbaugh
(74) *Attorney, Agent, or Firm* — Notaro, Michalos & Zaccaria P.C.

(57) ABSTRACT

A method for minimizing the dead volume in a vial presenting a liquid for aspiration is provided. The method comprises, after determining that the liquid volume indicated to be available in the vial is not sufficient for a further aspiration step, moving downward in direction towards the bottom of the vial by means of a pipetting arm presenting a pipetting tip and along the z-axis of the pipetting arm until the pipetting arm comes to a stop in a first stop position. Then, the actual available liquid volume is calculated based on said first stop position. In case the calculated actual available liquid volume is sufficient, a further aspiration step can be executed. Furthermore, a liquid handling system for minimizing dead volume, a computer-implemented method for controlling a pipetting arm of such a liquid handling system, and the use of a hysteresis determination method for minimizing dead volume are provided.

24 Claims, 11 Drawing Sheets

Figures 1, 7:
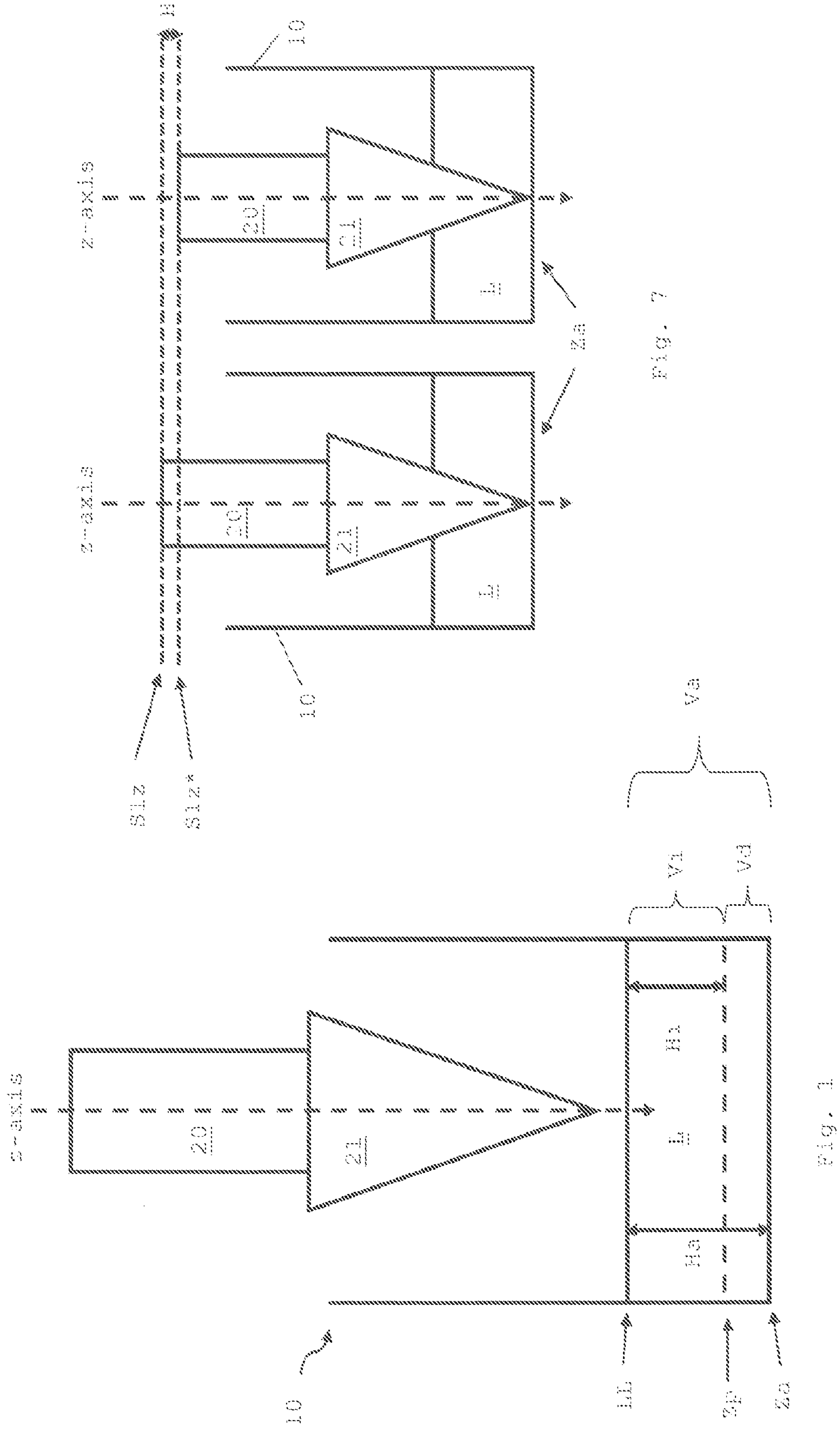

10
20
21
L
z-axis
Zp/LL
Vd/
Vi
S1a
Za
LL
Ha
Va
LLz
S1z

DEAD VOLUME REDUCTION AND METHOD THEREFOR

The present invention relates to the technical field of liquid processing systems, in particular to automated liquid processing systems and is directed to the reduction of dead volume, in particular to a method for the reduction of dead volume in a vial for presenting a liquid for aspiration. A further aspect of the invention is directed to a device for the reduction of dead volume and the use of a method for hysteresis correction for further reducing dead volume.

When large quantities of samples must be examined in medical, chemical, analytical, or pharmaceutical laboratories, automated laboratory systems are usually used today to enable rapid and reliable processing of each individual sample. Such laboratory systems are often designed as liquid processing systems for handling liquid volumes. Most laboratory applications require very precise pipetting operations to achieve satisfactory analytical accuracy. In order to guarantee such precise pipetting, there is always a predetermined safety limit defined, which prevents both the aspiration of air and the execution of an aspiration step when there is actually not enough liquid left for such a further aspiration step. However, when expensive chemicals are used, the safety limit leads to a significant waste of the chemical itself and therefore also to higher, unnecessary costs. For rare substances it is even worse as here it is a delicate and valuable good that is wasted. With common automated laboratory systems, the compromise between safe and precise liquid handling, on the one hand, and the maximum exploitation of resources, on the other hand, is not satisfactory, in particular not for expensive chemicals and rare substances.

The objective of the present invention is thus the reduction of dead volume in automated liquid handling, in particular to improve the exploitation of the liquid to be handled without affecting the safety and accuracy of the liquid handling process itself.

This object is achieved by a method for according to claim 1, which allows for an improved exploitation of the liquid to be aspirated.

A method according to the invention comprises determining whether the liquid volume indicated to be available in the vial is sufficient for a further aspiration step and, if not, moving downward in direction towards the bottom of the vial by means of a pipetting arm presenting a pipetting tip and along the z-axis of the pipetting arm until the pipetting arm comes to a stop in a first stop position. Furthermore, the first stop position of the pipetting arm (20) or alternatively the first safety corrected stop position of the pipetting arm, which is the first stop position corrected by a predetermined safety measure, is stored.

The further step or steps depend on the version of the method, which shall be performed.

Version 1:

In addition to the already mentioned steps, the actual available liquid volume is calculated based on the liquid level known from determining whether the liquid volume indicated to be available in the vial is sufficient for a further aspiration step and on the first stop position. Alternatively, the actual safety corrected available liquid volume is calculated based on the liquid level determining whether the liquid volume indicated to be available in the vial is sufficient for a further aspiration step and on the first safety corrected stop position.

Version 1 is in particular beneficial when liquid was detected but not in a sufficient amount.

Version 2:

In addition to the steps mentioned before introducing version 1, the liquid level of the liquid provided in the vial is detected and the actual available liquid volume is calculated based on the detected liquid level and the first stop position or the liquid level of the liquid provided in the vial is detected and the actual safety corrected available liquid volume is calculated based on the detected liquid level and the first safety corrected stop position.

Version 2 is in particular beneficial when no liquid at all has been detected to verify, if the vial is really empty.

Version 3:

This 3$^{rd}$ version is basically a combination of version 1 and version 2. In case the actual available liquid volume or the actual safety corrected available liquid volume turn out to be not enough for performing a further aspiration step after execution of version 1, it can be advisable to calculate the actual available liquid volume or the actual safety corrected available liquid volume again and this time not on the liquid level known from determining whether the liquid volume indicated to be available in the vial is sufficient for a further aspiration step but to determine the liquid level of the liquid provided in the vial and calculate the actual available liquid volume or the actual safety corrected available liquid volume based on this liquid level determination. Thus, it can be beneficial to first execute version 1 and then the additional steps of version 2.

What all versions of the method have in common is that they allow for a better exploitation of the liquid presented in the vial by determining the volume of this liquid more precisely when not referring to the predetermined inner bottom position of the vial but to the actual inner bottom position of the vial. For further details, please refer to FIGS. 1 to 6.

In one embodiment of the method according to the invention, which may be combined with any of the preaddressed embodiments and any of the embodiments still to be addressed unless in contradiction, the method further comprises either executing a further aspiration step when the calculated actual available liquid volume is sufficient or not executing a further aspiration step when the calculated actual available liquid volume is not sufficient, or alternatively either executing a further aspiration step when the calculated actual safety corrected available liquid volume is sufficient or not executing a further aspiration step when the calculated actual available liquid volume is not sufficient.

When having the chance to execute a further aspiration step, resources can be conserved, and money can be saved by better exploiting the liquid. In case the actual (safety corrected) available liquid volume is still not sufficient for a further aspiration step, an error message can be generated, such that, e.g., the operator can replace the (almost) empty vial by a full vial, or the pipetting apparatus can automatically be instructed to head to a different vial.

In one embodiment of the method according to the invention, which may be combined with any of the preaddressed embodiments and any of the embodiments still to be addressed unless in contradiction, the step of determining whether the liquid volume available in the vial is sufficient for a further aspiration step comprises detecting the liquid level of the liquid provided in the vial for a first time and calculating the indicated liquid volume in the vial. The calculation of the indicated liquid volume in the vial is in particular based on the indicated height of the liquid level or based on a predetermined inner bottom position of the vial.

Figure 2:
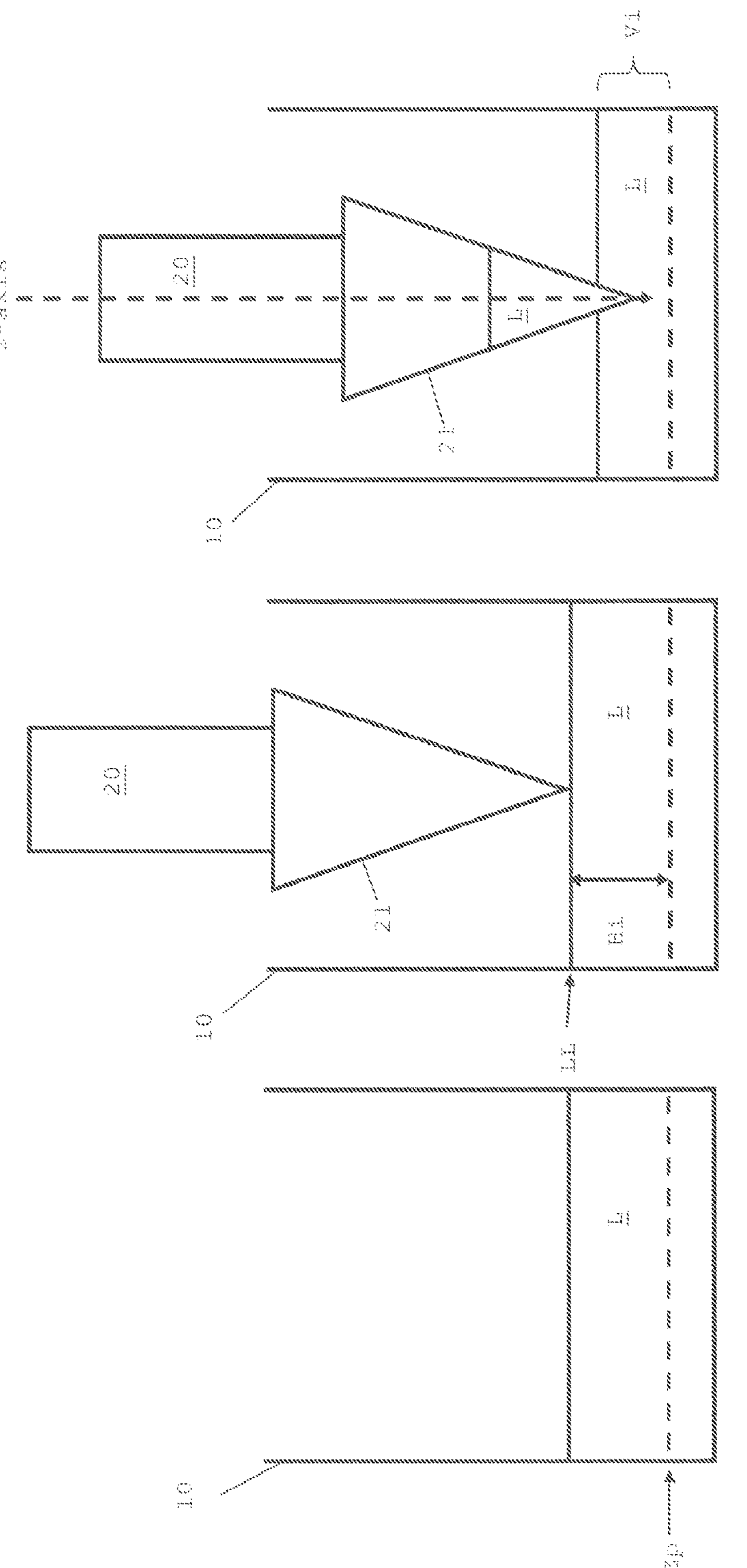

For further details, please refer to FIGS. 1 and 2.

In one embodiment of the method according to the invention, which may be combined with any of the preaddressed embodiments and any of the embodiments still to be addressed unless in contradiction, the step of detecting the liquid level of a liquid provided in the vial and/or the step of detecting the liquid provided in the vial for a first time is executed by conductive liquid level detection and/or by pressure based liquid level detection.

In general, it is beneficial to use the same detection method for liquid level detection steps, so namely for the liquid level detection step of the versions 2 and 3 of the method according to claim 1 and the detection of the liquid level for determining whether the liquid volume available in the vial is sufficient for a further aspiration step according to claim 3. However, it is also possible to implement both methods, e.g., by using pressure based liquid level detection for the liquid level detection for determining whether the liquid volume available in the vial is sufficient for a further aspiration step and conductive liquid level detection for the liquid level detection step of the versions 2 and 3 of the method according to claim 1. It is even possible to determine at least one of the liquid levels by means of both liquid level detection methods.

As conductive liquid level detection (cLLD) is further explained in the context of FIG. 2, at this point only details addressing pressure based liquid level detection (pLLD) will be given. In general, a pipetting apparatus configured for pressure based liquid level detection comprises a fluidic space to which a pressure transducer with a pressure sensor is attached. The pipetting apparatus continually aspirates as the pipetting tip is moved toward the surface of the liquid. When the pipetting tip encounters the surface of the liquid, the change in pressure caused by closing the orifice of the pipetting tip by the liquid is registered by the transducer, which signals a controller that the liquid surface is touched. All in all, before the pipetting tip hits the liquid level, small amounts of air are already aspirated causing little air resistance. And when the pipetting tip penetrates the liquid level, liquid is aspirated causing a higher resistance and thus a higher—measurable—pressure. Further information can be derived from EP0169071 and JP,59-052759,A(1984), for instance.

In one embodiment of the method according to the invention, which may be combined with any of the preaddressed embodiments and any of the embodiments still to be addressed unless in contradiction, a force at which the pipetting arm comes to a stop in the first stop position is predetermined.

Predetermining said force is in particular beneficial for the reproducibility of the method. The more parameters that have an impact on the determination of the actual (safety corrected) available liquid volume are continual, the higher the chances of receiving the same result when executing the method more than once. The force can be predetermined by the power drive control, which regulates that the motor is supplied with a preset maximum power, for instance.

In one embodiment of the method according to the invention, which may be combined with any of the preaddressed embodiments and any of the embodiments still to be addressed unless in contradiction, the method further comprises conductively detecting a conductive surface by means of the pipetting arm presenting the pipetting tip, wherein the position of the pipetting arm when conductively detecting the conductive surface is stored as first position. Afterwards, the pipetting arm is moved further towards the conductive surface and along the z-axis of the pipetting arm until the pipetting arm applies a predetermined force and therefore comes to a stop, wherein the position of the pipetting arm when coming to the stop is stored as second position. Then, the hysteresis is calculated by determining the height difference between the first position and the second position. The conductive surface is a non-anodized aluminum surface, for instance.

In general, the hysteresis is a source of tolerance that has an impact on the determination of the actual (safety corrected) available liquid volume. A hysteresis correction thus leads to a more precise determination of the actual (safety corrected) available liquid volume and therefore to a safer exploitation of the liquid. For further details, please see FIGS. 7 and 8.

In one embodiment of the method according to the invention, which may be combined with any of the preaddressed embodiments and any of the embodiments still to be addressed unless in contradiction, the calculated hysteresis is used for correcting the actual height of the liquid level, and/or for correcting the calculated actual available liquid volume, and/or for correcting the actual safety corrected height of the liquid level, and/or for correcting the calculated actual safety corrected available liquid volume. The calculated actual (safety corrected) available liquid volume and/or the actual (safety corrected) height of the liquid level are preferably corrected by correcting the first (safety corrected) stop position.

For instance, when the hysteresis turns out to be 1 mm, the actual (safety corrected) height of the liquid level would be higher by this 1 mm without a hysteresis correction, thus making the actual (safety corrected) liquid volume larger, but larger by a source of tolerance and not for real. When hysteresis correction is applied, the first stop position transferred to the position of the reference point of the pipetting arm is set 1 mm higher, thus making the actual (safety corrected) liquid volume smaller but its estimation less erroneous and therefore allowing for a safer exploitation of the liquid since overestimation of the available liquid volume is diminished. Please also consult FIGS. 3 and 7 for a better understanding.

In one embodiment of the method according to the invention, which may be combined with any of the preaddressed embodiments and any of the embodiments still to be addressed unless in contradiction, the predetermined force at which the pipetting arm comes to a stop in the first stop position is identical to the predetermined force at which the pipetting arm comes to a stop in the second position.

When both predetermined forces are identical or at least of little variation, let's say ±5 to 10%, the hysteresis correction of the first stop position is most precise. The larger the difference between these two predetermined forces, the less benefit derives from the hysteresis correction as the hysteresis is then not tailored to well suit the rest of the method for minimizing dead volume.

A further aspect of the invention addresses a liquid handling system for minimizing the dead volume in a vial presenting a liquid for aspiration. The automated liquid handling system comprises at least one pipetting arm that is connectable to a pipetting tip and operatively connected to a pressure source for aspirating and dispensing liquids. Furthermore, the automated liquid handling system comprises a workbench for supporting vials for presenting a liquid. In addition, the automated liquid handling system comprises means for liquid level detection and an operational unit configured to perform the method for minimizing dead volume according to the invention.

The workbench can support the vials either directly (i.e. vials are positioned directly on the workbench) or indirectly (i.e. vials are positioned in a rack or alike, which is positioned on the workbench). The operational unit is preferably a computer or processor, which is configured to perform in particular the method according to one of claims 1 to 6. The described liquid handling system comprises all means necessary for performing the method for minimizing dead volume. The means for liquid level detection may include a pipetting tip in case of cLLD.

In one embodiment of the liquid handling system according to the invention, which may be combined with any of the preaddressed embodiments and any of the embodiments still to be addressed unless in contradiction, the liquid handling system further comprises a conductive surface accessible by the at least one pipetting arm connected to a pipetting tip, wherein the operational unit is further configured to also execute the method according to one of claims 7 to 8.

As described previously, the method for minimizing the dead volume can i.a. comprise the steps of conductively detecting a conductive surface by means of the pipetting arm presenting the pipetting tip and moving the pipetting arm towards the conductive surface and along the z-axis of the pipetting arm until the pipetting arm applies a predetermined force and therefore comes to a stop. To perform these steps, the liquid handling system should present or include at least one conductive surface. The at least one conductive surface must not necessarily be formed integrally with the liquid handling system but can be added whenever needed and removed again when not needed anymore. A beneficial place for positioning the conductive surface, e.g., in form of a metal block, is of course the workbench. However, the conductive surface can be more or less positioned everywhere as long as the pipetting arm can move towards the conductive surface and along the z-axis of the pipetting arm until the pipetting arm applies a predetermined force and comes to a stop. But not only is the physical presence of the conductive surface required for the steps recently described but it is also the operational unit of the liquid handling system that must be configured in a way to perform these steps. In other words, the operational unit first directs the pipetting arm with the pipetting tip to the conductive surface to conductively detect the conductive surface as first position and then moves the pipetting arm towards the conductive surface and along the z-axis of the pipetting arm until the pipetting arm applies a predetermined force and therefore comes to a stop, which is defined as second position. Furthermore, the operational unit can store the first and second position and is also capable of calculating the hysteresis by determining the height difference between the first position and the second position. It is beneficial if the operational unit is further configured to correct the first (safety corrected) stop position based on said height difference to indirectly correct at least the actual (safety corrected) height of the liquid level or the calculated actual (safety corrected) available liquid volume. An even further aspect of the invention addresses a computer-implemented method for controlling a pipetting arm of a liquid handling system according to the invention to perform a method according to the invention.

Such a computer-implemented method can be run by means of the operational unit of the liquid handling system, for instance.

In one embodiment of the computer-implemented method according to the invention, which may be combined with any of the preaddressed embodiments and any of the embodiments still to be addressed unless in contradiction, the computer-implemented method comprises moving the pipetting arm presenting a pipetting tip downwards along the z-axis of the pipetting arm towards the bottom of a vial presented on the workbench of the liquid handling system until the pipetting arm comes to a stop in a first stop position. The force at which the pipetting arm comes to a stop in the first stop position is preferably predetermined.

By telling the pipetting arm to perform this task, the computer allows for the calculation of the actual (safety corrected) available liquid volume and thus for the better exploitation of the liquid.

In one embodiment of the computer-implemented method according to the invention, which may be combined with any of the preaddressed embodiments and any of the embodiments still to be addressed unless in contradiction, the computer-implemented method comprises conductively detecting a conductive surface by means of the pipetting arm presenting a pipetting tip and moving the pipetting arm towards the conductive surface and along the z-axis of the pipetting arm until the pipetting arm applies a predetermined force and therefore comes to a stop.

By telling the pipetting arm to perform these tasks, the computer allows for the calculation of the hysteresis and thus for the correction of the first (safety corrected) stop position to indirectly correct at least the actual (safety corrected) height of the liquid level or the calculated actual (safety corrected) available liquid volume.

An again further aspect of the invention addresses a computer-readable medium comprising transitory or non-transitory data representing a computer program, the computer program comprising instructions for causing a processor system to perform the computer-implemented method according to the invention.

The computer-readable medium can be a memory of the operational unit of the liquid handling system. Furthermore, the computer-readable medium can be a USB stick or any other transportable memory which can operationally be connected to the operational unit of the liquid handling system. The list of examples given is of course not exhaustive.

An again further aspect of the invention addresses the use of a hysteresis determination method for minimizing the dead volume in a vial presenting a liquid for aspiration. The method comprises conductively detecting a conductive surface by means of the pipetting arm presenting a pipetting tip and storing the position of the pipetting arm when conductively detecting the conductive surface as first position. Furthermore, the method comprises moving the pipetting arm towards the conductive surface and along the z-axis of the pipetting arm until the pipetting arm applies a predetermined force and therefore comes to a stop and storing the position when the pipetting arm comes to a stop as second position. Even further, the method comprises calculating the hysteresis by determining the height difference between the first position and the second position.

When using the hysteresis determination method, the exploitation of the liquid can further be improved by the possibility to correct the first (safety corrected) stop position and thus to indirectly correct at least the actual (safety corrected) height of the liquid level or the calculated actual (safety corrected) available liquid volume.

Figure 3:
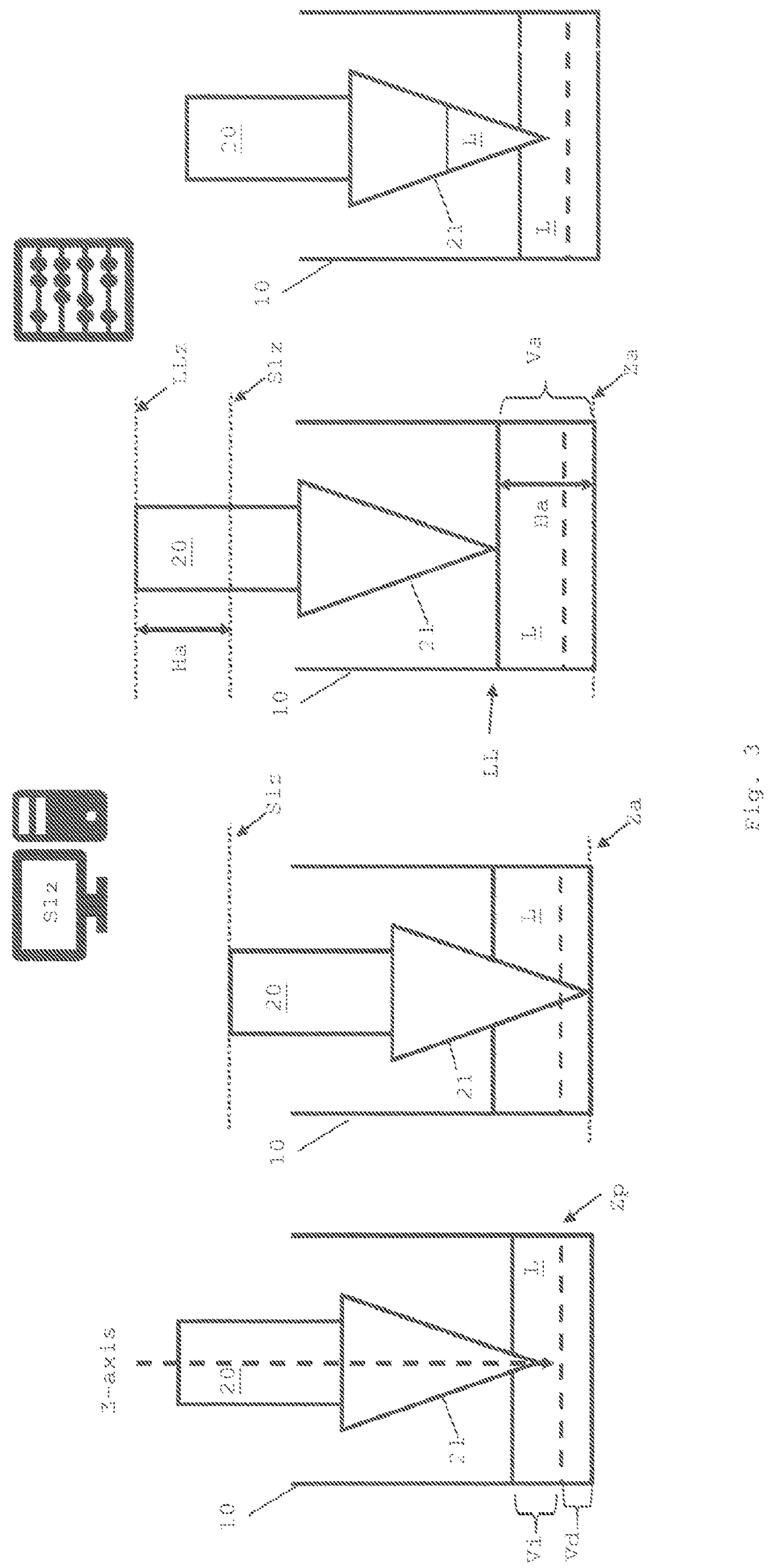
Figure 4:
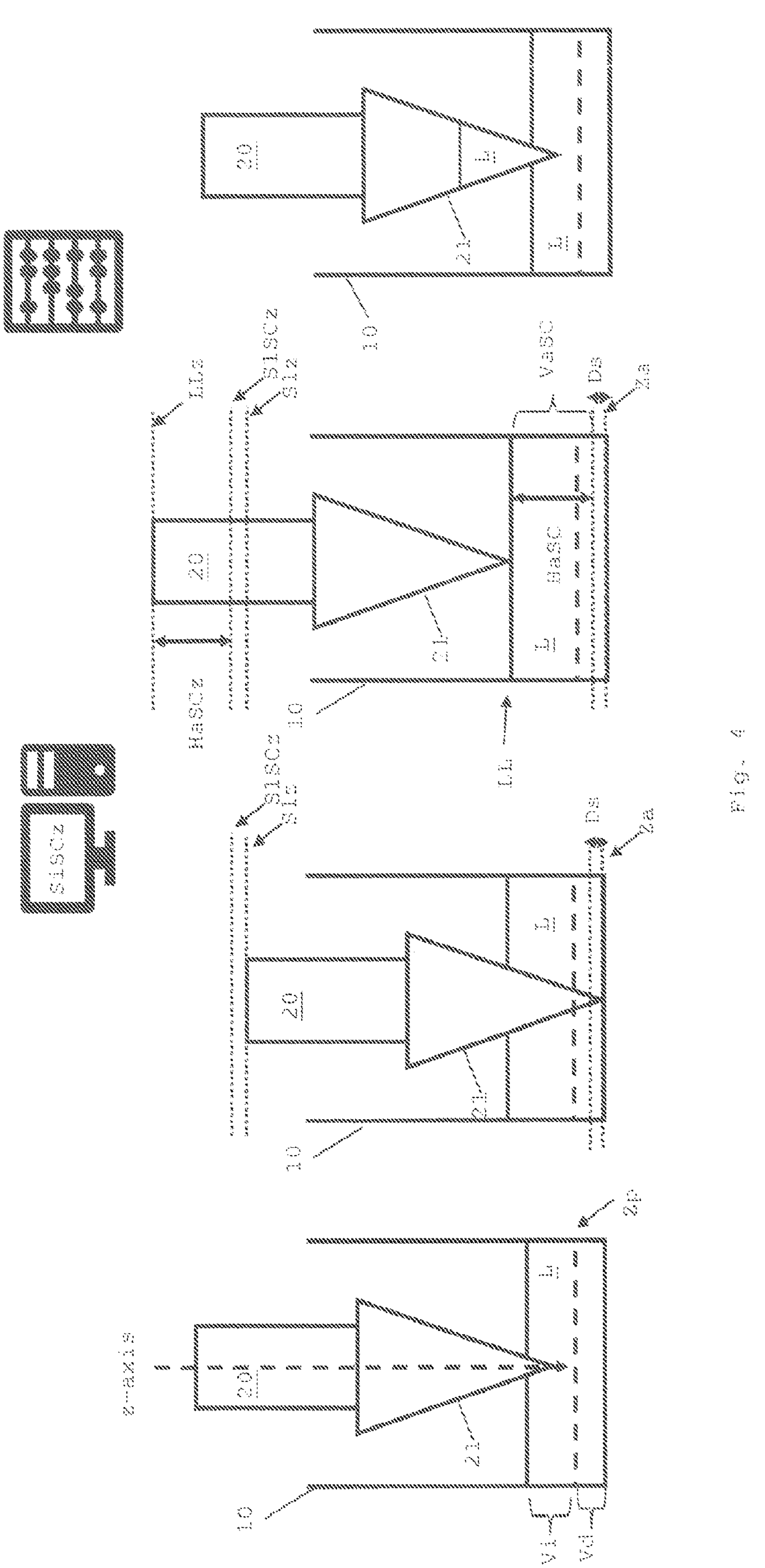
Figure 5:
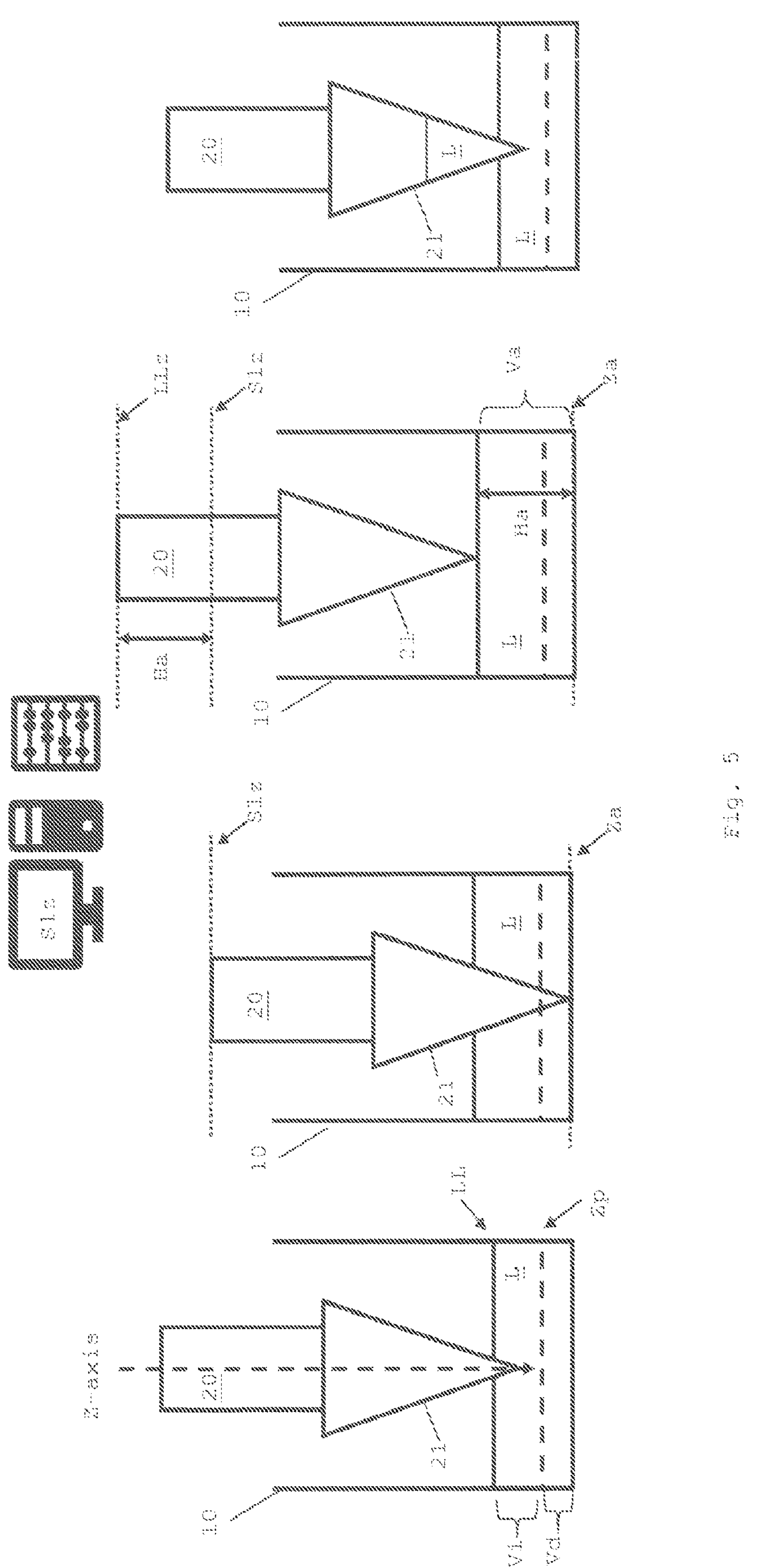
Figure 6:
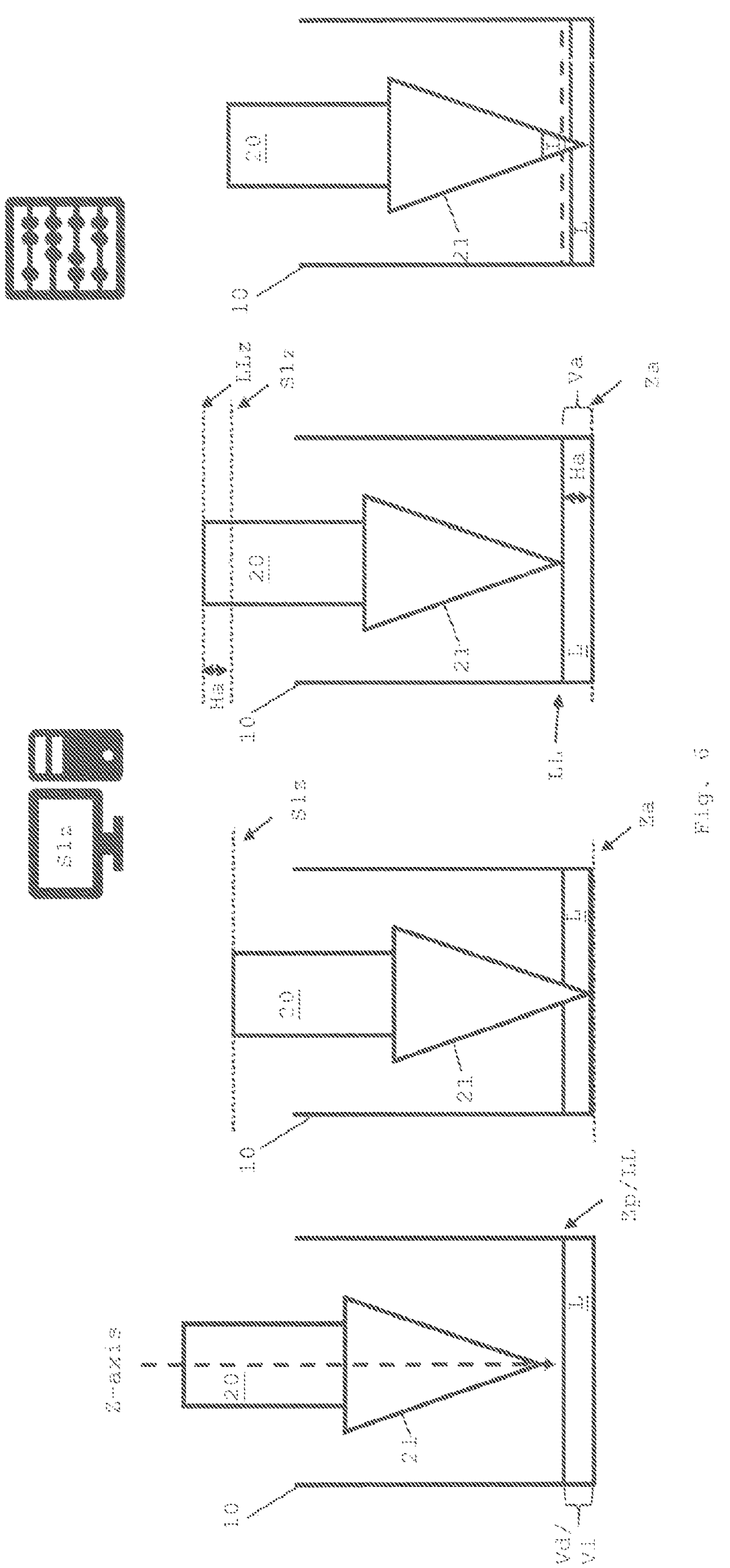
Figure 8:
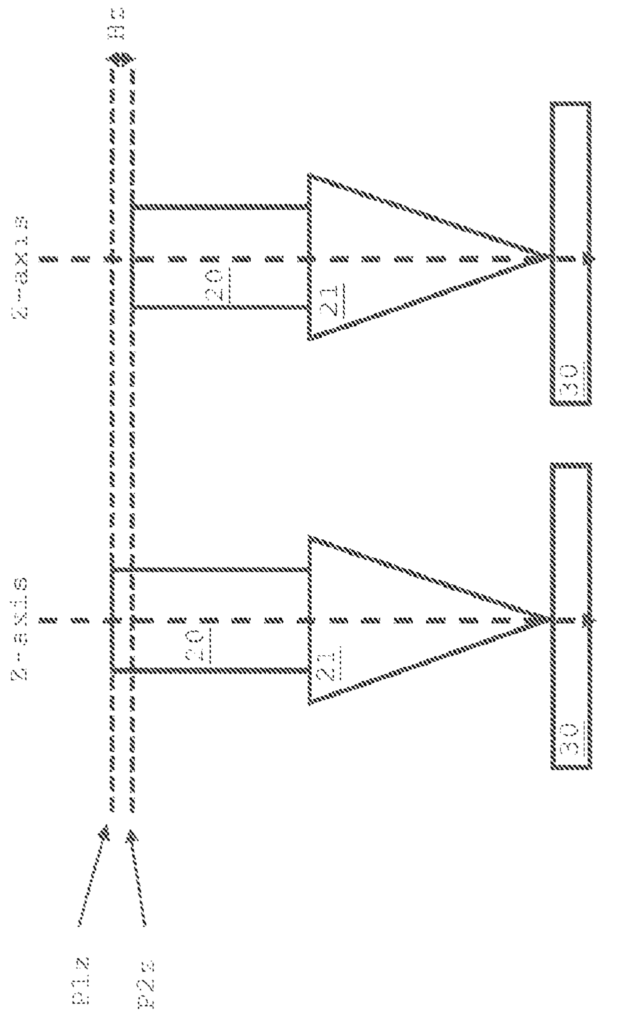
Figure 9:
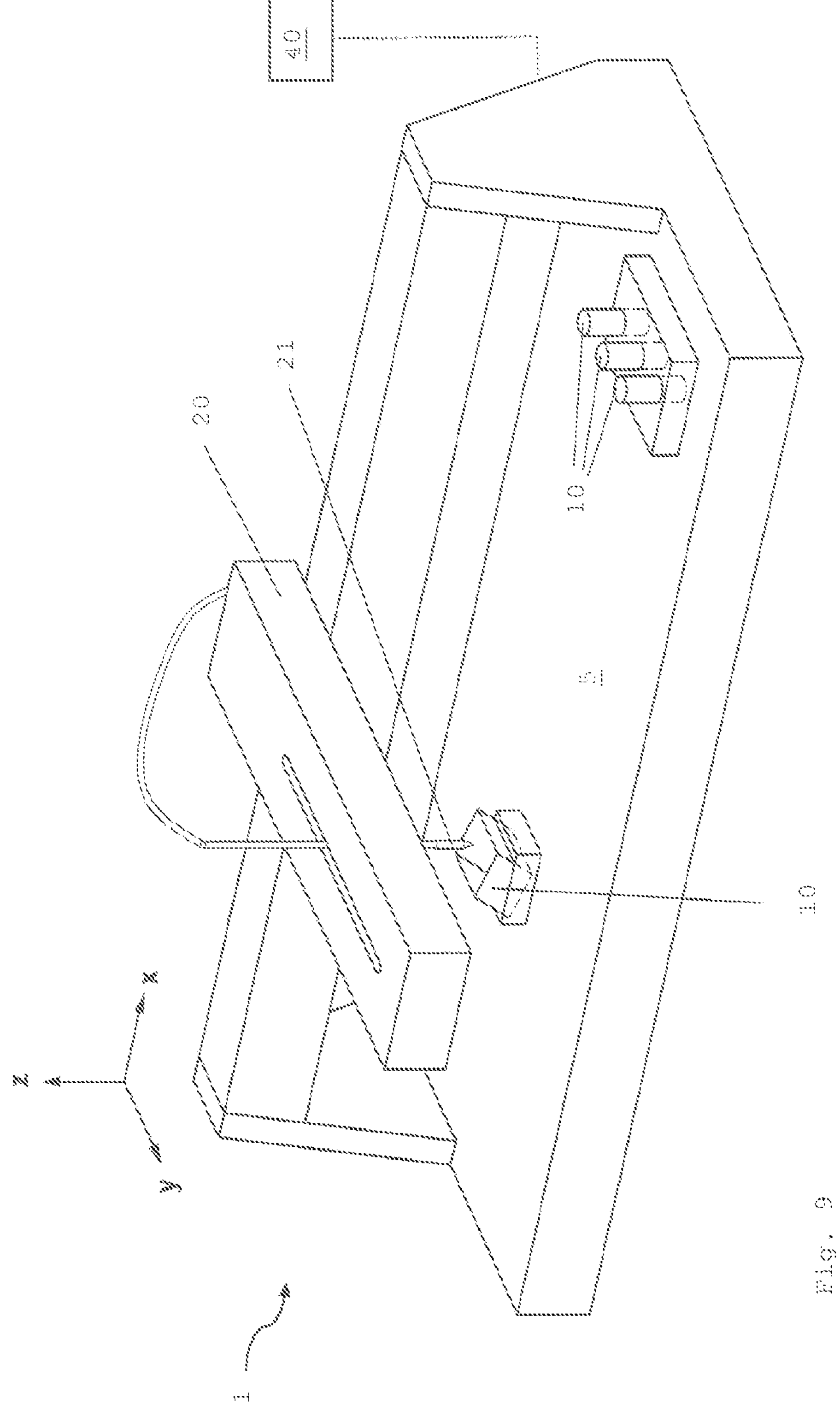
Figure 10:
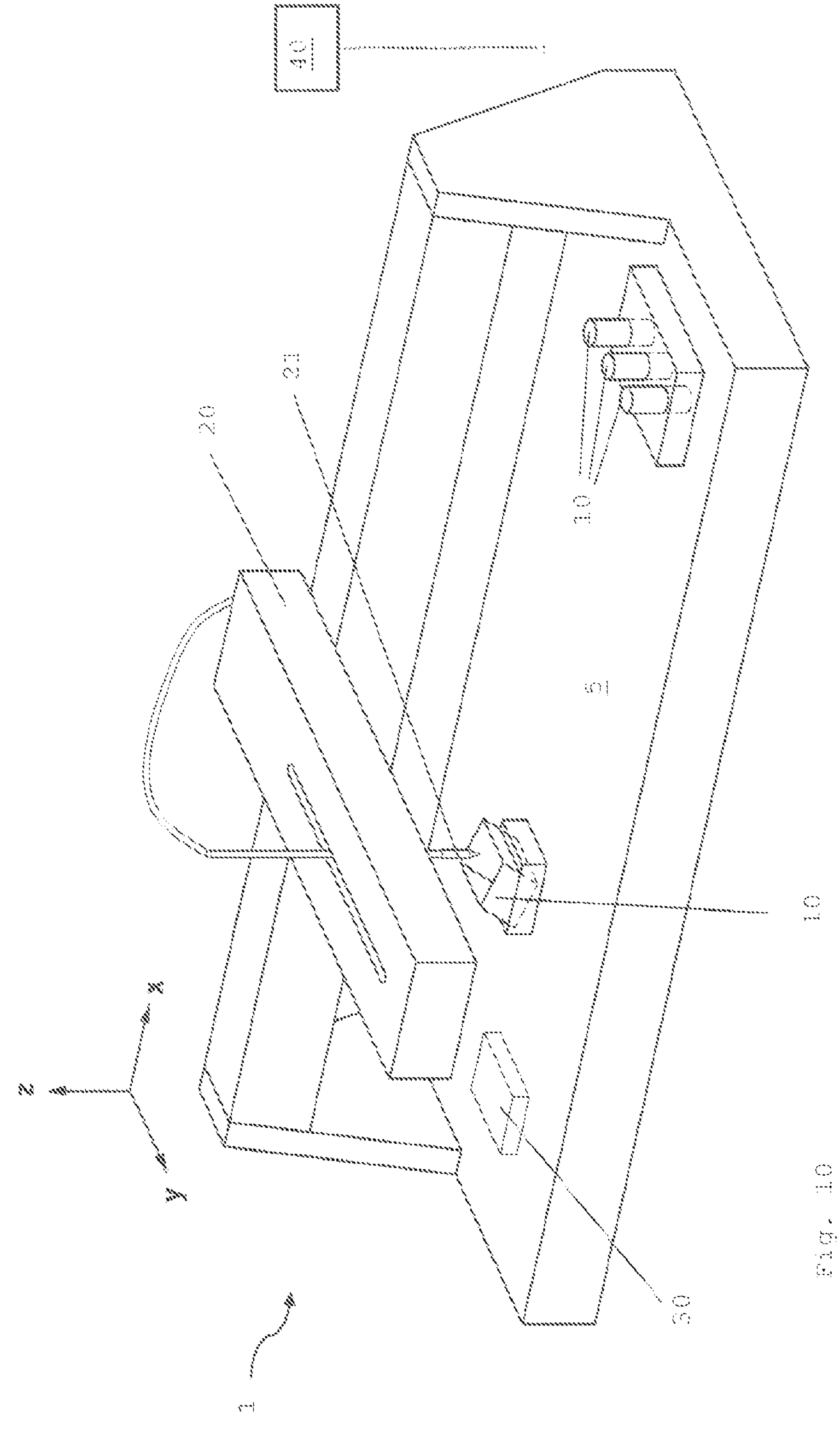
Figure 11:
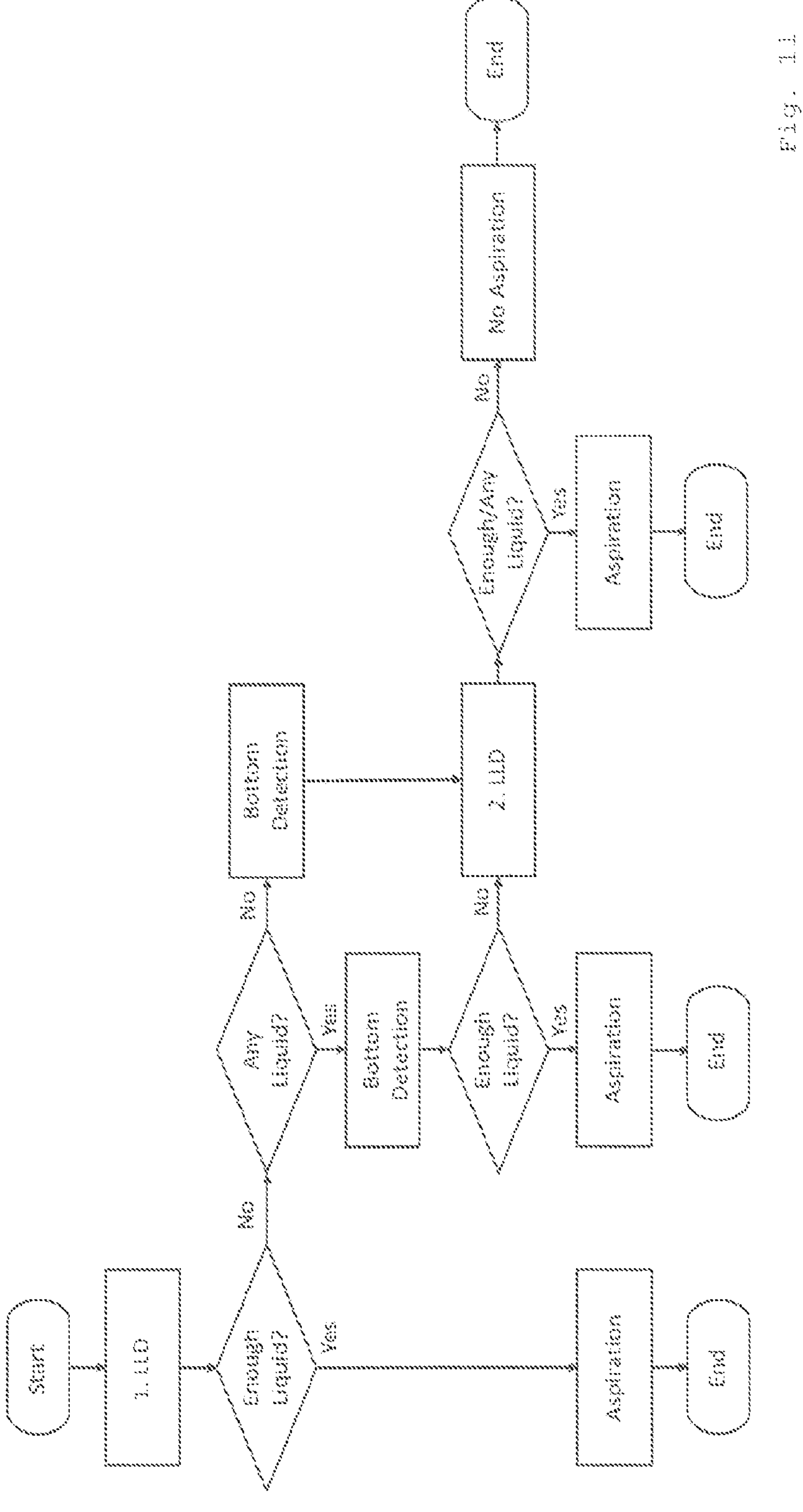
Figure 12:
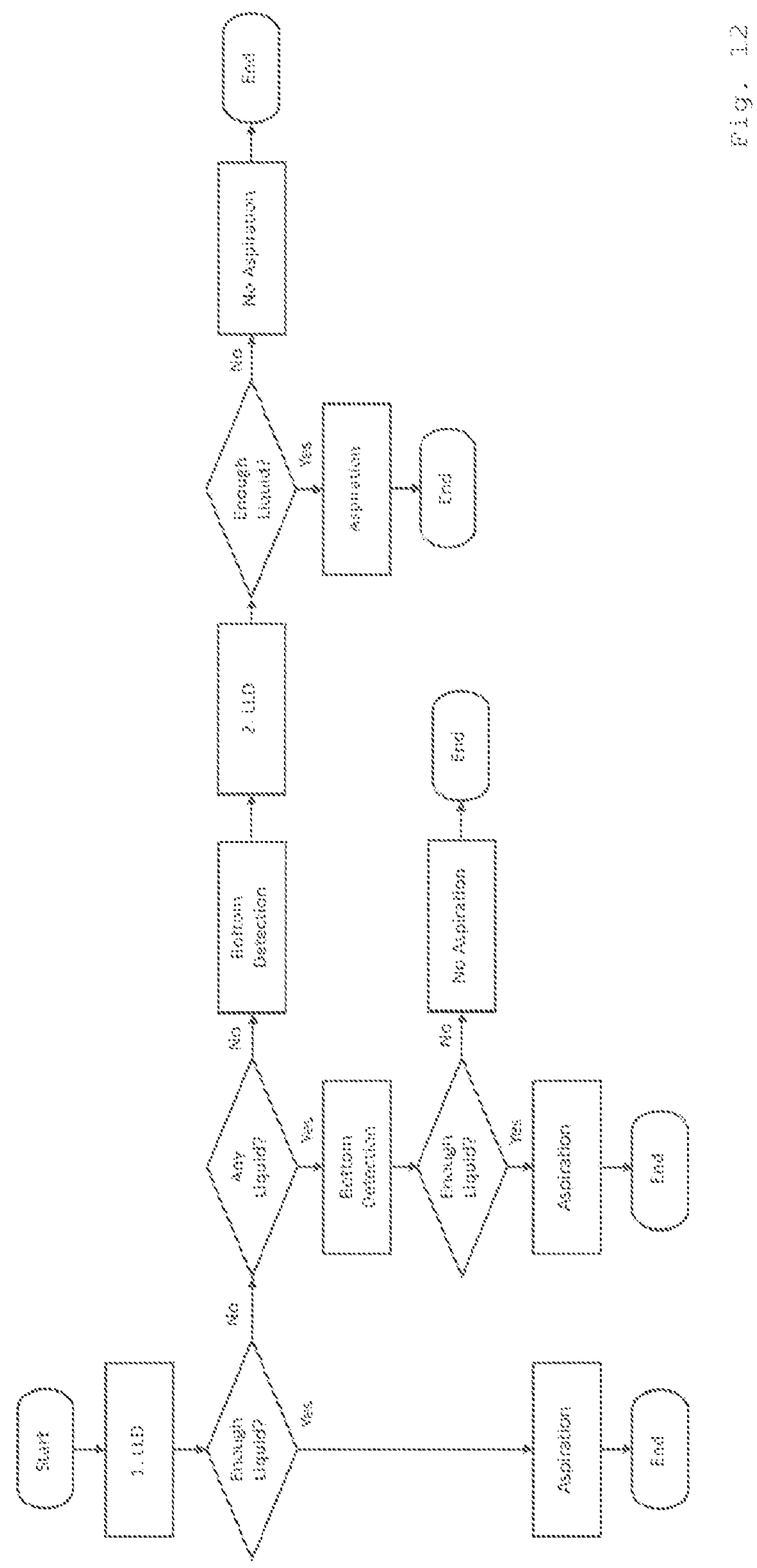

The invention shall now be further exemplified with the help of figures. The figures schematically show:

FIG. 1 a vial comprising a liquid to be aspirated;

FIG. 2 the work principle of well-known automated liquid handling systems;

FIG. 3 the principle of a method according to the invention;

FIG. 4 the principle of an embodiment of a method according to the invention;

FIG. 5 the principle of an embodiment of a method according to the invention;

FIG. 6 the principle of an embodiment of a method according to the invention;

FIG. 7 the principle of the hysteresis;

FIG. 8 a method for hysteresis determination;

FIG. 9 a liquid handling system according to the invention;

FIG. 10 an embodiment of a liquid handling system according to the invention;

FIG. 11 a flow chart of the various aspects of the method for minimizing the dead volume according to the invention; and FIG. 12 a further flow chart illustrating an embodiment of the method for minimizing the dead volume according to the invention.

FIG. 1 shows a vial 10 containing a liquid L to be aspirated. The vial 10 comprises an actual inner bottom position Za and a liquid level LL of a certain height Ha. Furthermore, the predetermined inner bottom position Zp of the vial is indicated. This predetermined inner bottom position Zp represents the predetermined safety limit. Various factors influence the setting of the predetermined safety limit that is stored in the storage of the automated pipetting apparatus (not shown) and controls how deep the pipetting arm 20 of the automated pipetting apparatus with the pipetting tip 21 ready for aspiration moves maximum in direction of the bottom of the vial 10, or in other words, along its own Z-axis. The position of the predetermined inner bottom position Zp is influenced by various factors, such as tolerances regarding the levelness of the worktable (the worktable supports the vial directly or indirectly when the vial is position in a vial block or alike) is not exactly of the same height over its entire area. Furthermore, the vial block comprises certain tolerances, such as variations in the depth of the bores or, when the bores are tilted, variations in the tilting angle. Other variations that must be taken into account are based on tolerances when fabricating the vials, such as varying wall thicknesses leading to varying cross-sections or bottom thicknesses. But also labels that stick to the outer surface of the wall of the vial play a role when having a certain thickness that stops the vial from slipping completely into the vial block or changing the tilting angle of a vial in a tilted bore when being applied not symmetrically around the circumference of the vial but one-sided or asymmetric. Furthermore, the precision of the movement and position of the pipetting arm, here in particular viewed in direction of the Z-axis, is also tainted with some tolerance. The underlying problem becomes clear when considering the liquid volume indicated to be available, the actual available volume Va and the dead volume Vd. Since the system assumes for safety reasons that the bottom of the vial is where the predetermined inner bottom position Zp is drawn, the system calculates based on this assumption on the detected liquid level LL, e.g. calculated by capacitive liquid level detection, that the available liquid volume is the indicated liquid volume Vi. However, when the system requires a larger volume than the indicated liquid volume Vi for the next aspiration step, the aspiration step is not executed and the pipetting arm heads for a new vial providing more liquid to be aspirated, for instance. Instead of heading for a new vial, e.g., an alarm can go off informing the user about the fact that there is not enough liquid left, or the available liquid is nonetheless aspirated and for instance not added to a vial containing a sample to be analyzed but added to a container where remaining or rather left over liquid, such as remaining reagents, are collected for further use. However, when taking the dead volume Vd into account, there would have been enough actual liquid volume Va for the next aspiration step. Unfortunately, state of the art automated pipetting apparatuses are not capable of realizing that there would have been sufficient liquid left such that the valuable left over gets just dumped instead of used.

Based on FIG. 2, it can be well explained how automated liquid processing systems known in the art decide whether a liquid volume available in a vial is sufficient for a further aspiration step. First, a vial 10 presenting a liquid L to be aspirated is provided on a workbench (not shown). The operation unit of the automated liquid processing system knows the geometry of the vial 10 and comprises also the predetermined inner bottom position of the vial Zp, which takes into account all kinds of system tolerances and thus prevents an overestimation of the volume available, resulting in the aspiration of air and/or the pipetting tip 21 crashing into the bottom of the vial 10. Next, the liquid level LL of the liquid L provided in the vial 10 is detected such that the indicated height Hi of the liquid level LL can be calculated. This detection can be based on pressure liquid level detection or on conductive liquid level detection, for instance. Examples on how conductive liquid level detection can be conducted can be derived from EP 3 594 639 A1, EP 3 452 223 A1 and also from EP 2 270 445 A1, for instance. Nonetheless, the basic principle will be explained at this point in short: In general, the pipetting tip represents a first electrode, the workbench a second electrode. The pipetting tip is thus conductive and, e.g., a fixed tip made of metal or a disposable tip made of conductive polymer or of non-conductive polymer filled with conductive material such as graphite. Between these two electrodes, the capacity is measured. When the pipetting tip is distant from a vial comprising a liquid and positioned on the workbench, the capacity is rather small since the surface area of the probe acting as the electrode is rather small and its distance to the other electrode (grounded surface) rather long. If then the pipetting tip is moved further and further towards the liquid level of the liquid in the vial and at some point even hits the liquid level, it comes to a sudden extension of the probe electrode, thus increasing the measured capacitance against the second electrode (i.e. grounded surface). This of course requires a certain degree of conductivity of the liquid. The pipetting tip 21 constructed for conductive liquid level detection (e.g. capable of representing an electrode) or the pipetting tip 21 of a pipetting apparatus capable of pressure liquid detection is moved further and further in direction of the liquid L in the vial 10 until the liquid L is finally noticed. Afterwards, the indicated liquid volume Vi in the vial 10 is calculated, e.g. by determining the indicated height Hi of the liquid level LL by distracting the predetermined inner bottom position of the vial Zp by the position of the liquid level LL in reference to the Z-axis and multiplying the indicated height Hi with the circular area of the cylindrical vial 10. Of course, the determination of the indicated available volume Vi can also be executed for more complex geometries, such as Eppendorf vials or alike, and also for vials that are not positioned parallel to the workbench but tilted. The operation unit controlling the hardware and performing the calculations just needs to know the geometry of the corresponding vial and, if tilted, its tilting angle. Finally, when the liquid volume indicated to be available Vi is larger than the required volume for a further aspiration step, liquid L from the vial 10 is aspirated into the pipetting tip 21 by means of the pipetting arm 20, which is operatively connected to a pressure source (not shown). But in case the liquid volume indicated to be available Vi is not large enough, known automated liquid processing systems must stop the liquid aspiration process and generate an error message. The pipetting arm of such a known automated liquid processing system then either moves to or must be directed to a different vial presenting enough liquid or the vial must be exchanged by a new one.

FIG. 3 shows an alternative to the known liquid processing systems and a way on how to reduce dead volume. After determining whether the liquid volume Vi indicated to be available in the vial 10 is sufficient for a further aspiration step (see FIG. 2) and having concluded that there is not enough liquid volume Vi indicated to be available, the pipetting arm 20 moves downward in direction towards the bottom of the vial 10 along the z-axis of the pipetting arm 20, wherein the pipetting tip 21 connected to the pipetting arm 20 dives deeper and deeper into the liquid L until the pipetting arm 20 comes to a stop in a first stop position S1*z*. The first stop position S1*z* is basically the position, in which the tip of the pipetting tip 21 hits the actual inner bottom Za of the vial. However, the tip of the pipetting tip 21 can touch the actual inner bottom Za of the vial with different intensities, i.e. with a different strength or force. It can touch the bottom rather softly but also with quite some force. Of course, this has no influence on the position of the actual inner bottom Za of the vial itself (assuming that the vial is made of a rather solid and not elastic or soft material) but may affect the position of the first stop position S1*z* relative to the z-axis of the pipetting arm 20. More about this so-called hysteresis effect will be explained later. But please note that this is the reason why it might be advisable in some embodiments of the invention to predetermine a force at which the pipetting arm 20 comes to a stop in the first stop position S1*z*. After the first stop position S1*z* of the pipetting arm 20 has been identified, it is stored in e.g. a memory, computer, processor or alike of the liquid processing system (not shown). Afterwards, the pipetting tip 21 is retracted, preferably slowly to avoid liquid drops hanging at the tip of the pipetting tip 21 provoking an earlier and false detection of the liquid level LL, until its tip is position above the liquid level LL again (not shown). Then the pipetting tip 21 is moved downwards in direction of the liquid level LL once more to detect the liquid level LL of the liquid L provided in the vial 10 for another time and the actual available liquid volume Va is calculated based on the first stop position S1*z* and on the liquid level LL detected for another time (the liquid level LL is set in reference to the z-axis of the pipetting arm 20—that is why the liquid level is shown in two different manners: once showing where the liquid level LL itself is located and once showing the liquid level LLz transferred to the position of the reference point of the pipetting arm when detecting the liquid level LL; the reference point—here the very end of the pipetting arm 20—has already been taken as reference point for the first stop position). The determination of the liquid level for another time is advisable to avoid wrong results as it is possible that the vial 10 was not properly inserted into the rack, e.g. not inserted to the very bottom of the rack (not shown), when the liquid level LL was determined before identifying the first stop position S1*z* and that after the identification of the first stop position S1*z* the vial 10 is positioned in a different (and proper) manner causing also a change in its position in relation to the reference point of the pipetting arm. Since the actual height of the liquid level Ha is higher than in the conventional method explained based on FIG. 2, the actual available liquid volume Va is also larger. In case it is large enough, a further aspiration step can be executed and the former dead volume Vd being dependent on the predetermined inner bottom position of the vial can be exploited, at least in parts. FIG. 4 shows an embodiment of a method for reducing dead volume. The single steps are basically the same than explained in view of FIG. 3, however, with some minor adaptations. After determining whether the liquid volume Vi indicated to be available in the vial 10 is sufficient for a further aspiration step (see FIG. 2) and having concluded that there is not enough liquid volume Vi indicated to be available, the pipetting arm 20 moves downward in direction towards the bottom of the vial 10 along the z-axis of the pipetting arm 20, wherein the pipetting tip 21 connected to the pipetting arm 20 dives deeper and deeper into the liquid L until the pipetting arm 20 comes to a stop in a first stop position S1*z*. This time, instead of just storing the first stop position S1*z*, the first stop position S1*z* is corrected by a predetermined safety distance Ds and it is this first safety corrected stop position S1SCz of the pipetting arm 20 that is stored. The predetermined safety distance Ds shall prevent a blocking of the pipetting tip and/or the crashing of the pipetting tip into the vial bottom during aspiration. Afterwards, the pipetting tip 21 is slowly retracted (not shown) and again moved towards the liquid L to detect the liquid level LL of the liquid L provided in the vial 10 once more. Then, the actual available safety corrected liquid volume VaSC is calculated based on the first safety corrected stop position S1SCz and the once more detected liquid level LL or rather the once more liquid level LLz transferred to the position of the reference point of the pipetting arm when detecting the liquid level LL. Since the actual safety corrected height of the liquid level HaSC is larger than in the conventional method explained based on FIG. 2, the actual available safety corrected liquid volume VaSC is also larger. In case it is large enough, a further aspiration step can be executed and the former dead volume Vd being dependent on the predetermined inner bottom position of the vial can be exploited, at least in parts.

FIG. 5 shows an embodiment of a method for reducing dead volume. After determining whether the liquid volume Vi indicated to be available in the vial 10 is sufficient for a further aspiration step (see FIG. 2) and having concluded that there is not enough liquid volume Vi indicated to be available, the pipetting arm 20 moves downward in direction towards the bottom of the vial 10 along the z-axis of the pipetting arm 20, wherein the pipetting tip 21 connected to the pipetting arm 20 dives deeper and deeper into the liquid L until the pipetting arm 20 comes to a stop in a first stop position S1*z* (note: S1*z* is transferred to the position of the reference point of the pipetting arm). The first stop position S1*z* is basically the position, in which the tip of the pipetting tip 21 hits the actual inner bottom Za of the vial. After the first stop position S1*z* of the pipetting arm 20 has been identified, it is used, together with the liquid level LL determined when determining whether the liquid volume Vi indicated to be available in the vial 10 is sufficient for a further aspiration step (see FIG. 2) at the beginning, to determine whether the actual available liquid volume Va in the vial 10 is sufficient for a further aspiration step. Please note that the liquid level LL is shown twice: Once where it is located "in real" and once as LLz transferred to the position of the reference point of the pipetting arm the liquid level. Of course, it is beneficial to also store the first stop position S1*z* in, e.g., a memory, computer, processor or alike of the liquid processing system (not shown). After the identification of the first stop position S1*z*, the pipetting tip 21 is retracted. Since the actual height of the liquid level Ha is higher than in the conventional method explained based on FIG. 2, the actual available liquid volume Va is also larger. In case it is large enough, a further aspiration step can be executed and the former dead volume Vd being dependent on the predetermined inner bottom position of the vial can be exploited, at least in parts.

Please note that in the embodiment of the method explained based on FIG. 5, it was the actual available liquid volume Va that was calculated based on i.a. the first stop position S1*z*. However, it is also possible to perform the method in a slightly amended manner, namely, to calculate the actual safety corrected available liquid volume VaSC based on i.a. the first safety corrected stop position S1SCz. For further details, please refer to FIG. 3 and FIG. 4.

FIG. 6 shows an embodiment of a method for reducing dead volume. After determining whether the liquid volume Vi indicated to be available in the vial 10 is sufficient for a further aspiration step (see FIG. 2) and having concluded that there is no liquid volume Vi indicated to be available at all, the pipetting arm 20 moves downward in direction towards the bottom of the vial 10 along the z-axis of the pipetting arm 20 until the pipetting arm 20 comes to a stop in a first stop position S1*z* (note: S1*z* is transferred to the position of the reference point of the pipetting arm). The conclusion that there is no liquid volume Vi indicated to be available at all can be based on the fact that the vial 10 is indeed completely empty (not the case in FIG. 6) or that the liquid level LL is maximum as high as the predetermined inner bottom position of the vial Zp (as is the case here). The first stop position S1*z* is basically the position, in which the tip of the pipetting tip 21 hits the actual inner bottom Za of the vial. After the first stop position S1*z* of the pipetting arm 20 has been identified, it is stored in, e.g., a memory, computer, processor or alike of the liquid processing system (not shown). Afterwards, the pipetting tip 21 is retracted, preferably slowly to avoid, if the vial 10 is not completely empty, liquid drops hanging at the tip of the pipetting tip 21 provoking an earlier and false detection of the liquid level LL, until its tip is position above the liquid level LL again (not shown). Then the pipetting tip 21 is moved downwards in direction of the liquid level LL once more to detect the liquid level LL of the liquid L provided in the vial 10 for another time and the actual available liquid volume Va is calculated based on the first stop position S1*z* and on the liquid level LL detected for another time. Please note that the liquid level LL is shown twice: Once where it is located "in real" and once as LLz transferred to the position of the reference point of the pipetting arm the liquid level. Since the actual height of the liquid level Ha is higher than in the conventional method explained based on FIG. 2, the actual available liquid volume Va is also larger. In case it is large enough, a further aspiration step can be executed and the former dead volume Vd being dependent on the predetermined inner bottom position of the vial can be exploited, at least in parts. If no liquid at all could be detected when trying to detect the liquid level LL of the liquid L provided in the vial 10 for another time, no actual available liquid volume Va can be calculated, and the method comes to an end without executing a further aspiration step.

Please note that in the embodiment of the method explained based on FIG. 6, it was the actual available liquid volume Va that was calculated based on i.a. the first stop position S1*z*. However, it is also possible to perform the method in a slightly amended manner, namely to calculate the actual safety corrected available liquid volume VaSC based on i.a. the first safety corrected stop position S1SCz. For further details, please refer to FIG. 3 and FIG. 4.

FIG. 7 illustrates a further source of tolerance, namely the z-axis hysteresis Hz. In general, hysteresis means that there are different values of one variable depending on the direction of change of another variable. In the specific context of this invention, hysteresis means that the tip of the pipetting tip 21 can be in contact with the inner bottom of a vial 10 at exactly the same position viewed in direction of the z-axis but the pipetting arm 20 presenting the pipetting tip 21 is not in the very same position viewed in direction of the z-axis. This difference in position of the pipetting arm 20 is due to the mechanics (e.g. gear wheels and such) driving the pipetting arm and the tolerances of these mechanics. The difference can lay in the range of 0.1 mm to 1.0 mm or even in the range of several mm, e.g. 1-2 mm up to 3-4 mm; in particular caused by intense use and the corresponding signs of wear. In the context of FIG. 3, a reference point (the very end of the pipetting arm 20) has already been introduced as reference point for the first stop position S1*z* and will be maintained for explaining FIG. 7. To be seen are two vials containing a liquid Land a pipetting arm 20 presenting a pipetting tip 21 each. Both tips of the pipetting tips 21 are in contact with the actual inner bottom Za of the vial 10. However, the first stop position S1*z of the pipetting arm on the right-hand side is lower than the first stop position S1***z* of the pipetting arm 20 on the left-hand side. This effect is a general source of error in a liquid handling system and can in particular cause wrong results when determining the availability of liquid volumes.

FIG. 8 explains a hysteresis determination method for minimizing the dead volume in a vial presenting a liquid for aspiration. In a first step, the pipetting arm 20 presenting a pipetting tip 21 capacitively detects a conductive surface 30 for a first time by a first touch based on the means that can be used for capacitive liquid level detection cLLD already presented by the liquid handling system (not shown) and stores the position of detecting the conductive surface 30 as first position P1*z*. Then, the pipetting arm 20 is moved further towards the conductive surface and along the z-axis of the pipetting arm 20 until the pipetting arm 20 comes to a stop (so-called mechanical hard stop) at a predetermined force. Optionally, the pipetting arm 20 can first be retracted and then moved further towards the conductive surface and along the z-axis of the pipetting arm 20 until the pipetting arm 20 comes to the stop at the predetermined force. This would lead to a second detection of the conductive surface 30. The predetermined force can be controlled via the motor drive control of the motor driving the pipetting arm, for instance. The position of the pipetting arm 20 at which it comes to the mechanical hard stop is stored as second position p2*z* and, based on the height difference between the first position P1*z* and the second position P2*z*, the hysteresis Hz can be calculated.

FIG. 9 shows a liquid handling system 1 for minimizing the dead volume in a vial 10 presenting a liquid for aspiration. In the shown example, the vial 10 presenting the liquid for aspiration is tilted and supported in a single rack. The liquid handling system 1, preferably an automated liquid handling system, comprises a pipetting arm 20 connectable to a pipetting tip 21 and operatively connected to a pressure source for aspirating and dispensing liquids (pressure source not shown). The pipetting arm 20 is positioned such that a pipetting tip 21 connected to the pipetting arm 20 can aspirate liquid from the tilted vial 10. Furthermore, the liquid handling system 1 comprises a workbench 5 for supporting vials 10. On the one hand, the workbench 5 is supporting the tilted vial 10 in the single rack, on the other hand, it is supporting further vials 10 positioned in a multiple rack waiting for their use. For instance, the vials 10 in the multiple rack represent samples to be analyses waiting for a certain volume of liquid, e.g. a specific reagent, to be transferred from the tilted vial 10. Moreover, the liquid handling system 1 comprises means for liquid level detection, such as means for capacitive liquid level detection or pressure liquid level detection (means for liquid level detection not shown). Even further, the liquid handling system 1 comprises an operation unit 40, such as a computer or processor, configured to perform the method for minimizing the dead volume in a vial presenting a liquid for aspiration according to the invention and as, e.g., exemplified in connection with FIG. 3 and FIG. 4.

FIG. 10 shows an embodiment of a liquid handling system 1 for minimizing the dead volume in a vial 10 presenting a liquid for aspiration. In addition to the liquid handling system 1 shown in FIG. 7, the one of FIG. 8 comprises a conductive surface 30 positioned on the workbench 5 and accessible by a pipetting tip 21 connected to the pipetting arm 20. The operation unit 40 of this liquid handling system 1 is not only capable of executing the method for minimizing the dead volume in a vial presenting a liquid for aspiration according to the invention and as, e.g., exemplified in connection with FIG. 3 and FIG. 4, but is also configured to perform a hysteresis determination and correction, as e.g. exemplified in connection with FIG. 6.

FIG. 11 shows a flow chart representing the various basic aspects and decisions to be taken when executing the method for minimizing the dead volume according to the invention. At the beginning, a first liquid level detection ("1. LLD") is performed to find out whether the liquid volume indicated to be available in the vial is sufficient for a further aspiration step. If so, the further aspiration step ("Aspiration") is executed. If not, the question arises if there was any liquid detected at all. For a better understanding these two decisions, if there is enough liquid and if there is any liquid at all, are illustrated as separate steps. However, it is also possible to answer both decisions in a single step and classify in this single step between "enough liquid", "too little liquid" and "no liquid at all". Independent on whether there is not enough liquid detected in the first liquid level detection ("1. LLD") due to "too little liquid" or "no liquid at all", a bottom detection is performed to determine the first stop position. In case there was "too little liquid", the liquid level is calculated based on the first liquid level detection and the first stop position to decide again whether there is enough liquid. If so, the further aspiration step ("Aspiration") is executed. If not, a second liquid level detection ("2. LLD") is performed and the question whether there is enough liquid is answered again based on the second liquid level detection ("2. LLD") and the first stop position. If so, the further aspiration step ("Aspiration") is executed. If not, no aspiration step is executed ("No Aspiration") and, e.g., the pipetting apparatus aims for a different vial or activates an alarm to catch the operator's attention (not shown in the flow chart). As already mentioned, independent on whether there is not enough liquid detected in the first liquid level detection ("1. LLD") due to "too little liquid" or "no liquid at all", a bottom detection is performed to determine the first stop position. However, in case there was "no liquid at all", the liquid level is not calculated based on the first liquid level detection and the first stop position to decide again whether there is enough liquid, but the first stop position is just stored and a second liquid level detection ("2. LLD") is performed. Based on this second liquid level detection ("2. LLD") and the stored first stop position it is decided again whether there is enough liquid. If so, the further aspiration step ("Aspiration") is executed. If not, no aspiration step is executed ("No Aspiration") and, e.g., the pipetting apparatus aims for a different vial or activates an alarm to catch the operator's attention (not shown in the flow chart).

FIG. 12 shows a further flow chart illustrating an embodiment of the method for minimizing the dead volume according to the invention. The first decision to be taken ("Is there enough liquid?" after 1. LLD) is identical for either answer to the flow chart of FIG. 11. However, in this embodiment, a strict separation between the two cases "too little liquid" and "no liquid at all" is made from the second decision ("Is there any liquid at all?") on. In case there is "too little liquid", a bottom detection is performed to determine the first stop position and the liquid level is calculated based on the first liquid level detection and the first stop position to decide again whether there is enough liquid. If so, the further aspiration step ("Aspiration") is executed. If not, no aspiration step is executed ("No Aspiration") and, e.g., the pipetting apparatus aims for a different vial or activates an alarm to catch the operator's attention (not shown in the flow chart). Opposite to the flow chart of FIG. 11, no second liquid level detection ("2. LLD") is performed. In case there is "no liquid at all", a bottom detection is performed to determine the first stop position and. Opposite to the case where there is "too little liquid", the liquid level is not calculated based on the first liquid level detection and the first stop position to decide again whether there is enough liquid, but the first stop position is just stored and a second liquid level detection ("2. LLD") is performed. Based on this second liquid level detection ("2. LLD") and the stored first stop position it is decided again whether there is enough liquid. If so, the further aspiration step ("Aspiration") is executed. If not, independent on whether there is still "no liquid at all" or just "too little liquid", no aspiration step is executed ("No Aspiration") and, e.g., the pipetting apparatus aims for a different vial or activates an alarm to catch the operator's attention (not shown in the flow chart).

| Reference Signs | |
|---|---|
| 1 | Liquid handling system |
| 5 | Workbench |
| 10 | Vial |
| 20 | Pipetting arm |
| 21 | Pipetting tip |
| 30 | Conductive surface |
| 40 | Operation unit |
| L | Liquid |
| LL | Liquid level |
| LLz | Liquid level transferred to reference point pipetting arm |
| V | liquid volume |
| Va | Actual liquid volume |
| VaSC | Actual safety corrected liquid volume |
| Vd | Death volume |
| Vi | liquid volume indicated to be available |
| Ha | Actual height of the liquid level |
| HaSC | Actual safety corrected height of the liquid level |
| Hi | Indicated height of liquid level |
| Hz | Hysteresis |

-continued

| Reference Signs | |
|---|---|
| Ds | Safety distance |
| P1z | First position |
| P2z | Second position |
| S1z | First stop position |
| S1SCz | First safety corrected stop position |
| Za | Actual inner bottom position of the vial |
| Zp | Predetermined inner bottom position of the vial |
| z-axis | Z-axis of the pipetting arm |

The invention claimed is:

1. A method for minimizing the dead volume (Vd) in a vial (10) presenting a liquid (L) for aspiration, the method comprising:

determining whether the liquid volume (Vi) indicated to be available in the vial (10) is sufficient for a further aspiration step;

if not, moving downward in direction towards the bottom of the vial by means of a pipetting arm (20) presenting a pipetting tip (21) and along the z-axis of the pipetting arm (20) until the pipetting arm (20) comes to a stop in a first stop position (S1*z*);

storing the first stop position (S1*z*) of the pipetting arm (20) or correcting the first stop position (S1*z*) by a predetermined safety measure (Ds) and storing this first safety corrected stop position (S1SCz) of the pipetting arm (20); and further calculating the actual available liquid volume (Va) based on the liquid level known from determining whether the liquid volume (Vi) indicated to be available in the vial (10) is sufficient for a further aspiration step and the first stop position (S1*z*) or calculating the actual safety corrected available liquid volume (VaSC) based on the liquid level determining whether the liquid volume (Vi) indicated to be available in the vial (10) is sufficient for a further aspiration step and the first safety corrected stop position (S1SCz); and/or detecting the liquid level (LL) of the liquid (L) provided in the vial (10) and calculating the actual available liquid volume (Va) based on the detected liquid level (LL) and the first stop position (S1*z*) or calculating the actual safety corrected available liquid volume (VaSC) based on the detected liquid level (LL) and the first safety corrected stop position (S1SCz); and wherein the method further comprises:

conductively detecting a conductive surface (30) by means of the pipetting arm (20) presenting the pipetting tip (21);

storing the position of the pipetting arm (20) when conductively detecting the conductive surface (30) as first position (P1*z*);

moving the pipetting arm (20) towards the conductive surface (30) and along the z-axis of the pipetting arm (20) until the pipetting arm (20) applies a predetermined force and therefore comes to a stop;

storing the position when the pipetting arm (20) comes to a stop as second position (P2*z*);

calculating the hysteresis (Hz) by determining the height difference between the first position (P1*z*) and the second position (P2*z*).

2. The method according to claim 1, further comprising:

executing a further aspiration step when the calculated actual available liquid volume (Va) is sufficient; or executing a further aspiration step when the calculated actual safety corrected available liquid volume (VaSC) is sufficient; or not executing a further aspiration step when the calculated actual available liquid volume (Va) is not sufficient; or not executing a further aspiration step when the calculated actual safety corrected available liquid volume (VaSC) is not sufficient.

3. The method according to claim 1, wherein the step of determining whether the liquid volume (vi) available in the vial is sufficient for a further aspiration step comprises:

detecting the liquid level (LL) of a liquid (L) provided in the vial (10) for a first time;

calculating the indicated liquid volume (Vi) in the vial.

4. The method according to claim 1, wherein the step of detecting the liquid level (LL) of a liquid (L) provided in the vial (10) is executed by conductive liquid level detection (cLLD) and/or pressure based LLD (pLLD).

5. The method according to claim 3, wherein the step of detecting the liquid level (LL) of a liquid (L) provided in the vial (10) for a first time is executed by conductive liquid level detection (cLLD) and/or pressure based LLD (pLLD).

6. The method according to claim 1, wherein a force at which the pipetting arm (20) comes to a stop in the first stop position (S1*z*) is predetermined.

7. The method according to claim 1, wherein the calculated hysteresis (Hz) is used for correcting:

the actual height of the liquid level (Ha); and/or the calculated actual available liquid volume (Va); and/or the actual safety corrected height of the liquid level (HaSC); and/or the calculated actual safety corrected available liquid volume (VaSC).

8. The method according to claim 6, wherein the predetermined force at which the pipetting arm (20) comes to a stop in the first stop position (S1*z*) is identical to the predetermined force at which the pipetting arm (20) comes to a stop in the second position (P2*z*).

9. A liquid handling system (1) for minimizing the dead volume (Vd) in a vial (10) presenting a liquid (L) for aspiration, the automated liquid handling system comprising:

at least one pipetting arm (20) connectable to a pipetting tip (21) and operatively connected to a pressure source for aspirating and dispensing liquids;

a workbench (5) for supporting vials (10) for presenting a liquid (L);

means for liquid level detection;

an operational unit (40) configured to perform the method according to claim 1.

10. The liquid handling system (1) according to claim 9, further comprising a conductive surface (30) accessible by the at least one pipetting arm (20) connected to a pipetting tip (21).

11. A computer-implemented method for controlling the at least one pipetting arm (20) of the liquid handling system (1) according to claim 9, the method comprising:

moving the pipetting arm (20) presenting a pipetting tip (21) downwards along the z-axis of the pipetting arm (20) towards the bottom of a vial (10) presented on the workbench (5) of the liquid handling system (1) until the pipetting arm (20) comes to the stop in the first stop position (S1*z*).

12. A computer-implemented method for controlling the at least one pipetting arm (20) of the liquid handling system (1) according to claim 9, the method comprising:

conductively detecting a conductive surface (30) by means of the pipetting arm (20) presenting the pipetting tip (21);

moving the pipetting arm (20) towards the conductive surface (30) and along the z-axis of the pipetting arm (20) until the pipetting arm (20) applies a predetermined force and therefore comes to a stop.

13. A method for minimizing the dead volume (Vd) in a vial (10) presenting a liquid (L) for aspiration utilizing a hysteresis determination method, the method comprising:

conductively detecting a conductive surface (30) by means of pipetting arm (20) presenting a pipetting tip (21);

storing the position of the pipetting arm (20) when conductively detecting the conductive surface (30) as first position (P1z);

moving the pipetting arm (20) towards the conductive surface (30) and along the z-axis of the pipetting arm (20) until the pipetting arm (20) applies a predetermined force and therefore comes to a stop;

storing the position when the pipetting arm (20) comes to a stop as second position (P2z);

calculating the hysteresis (Hz) by determining the height difference between the first position (P1z) and the second position (P2z).

14. The method according to claim 1, wherein the conductive surface (30) is a non-anodized aluminum surface.

15. The method according to claim 2, wherein the step of not executing a further aspiration step when the calculated actual available liquid volume (Va) is not sufficient, or the step of not executing a further aspiration step when the calculated actual safety corrected available liquid volume (VaSC) is not sufficient, is combined with generating an error message.

16. The method according to claim 3, wherein the step of calculating the indicated liquid volume (Vi) in the vial is based on the indicated height (Hi) of the liquid level (LL) or based on a predetermined inner bottom position of the vial (Zp).

17. The method according to claim 7, wherein the actual height of the liquid level (Ha); and/or the calculated actual available liquid volume (Va); and/or the actual safety corrected height of the liquid level (HaSC); and/or the calculated actual safety corrected available liquid volume (VaSC) are corrected by correcting the first stop position (S1z) or by correcting the first safety corrected stop position (S1SCz).

18. The liquid handling system (1) according to claim 10, wherein the conductive surface (30) is formed integrally with the liquid handling system or is not formed integrally with the liquid handling system.

19. The liquid handling system (1) according to claim 18, wherein the conductive surface (30) is at least one of the following:

positioned on the workbench (5);

a metal block;

a non-anodized aluminum surface.

20. The liquid handling system (1) according to claim 9, wherein the operational unit (40) is a computer or processor.

21. The computer-implemented method according to claim 11, wherein a force at which the pipetting arm (20) comes to a stop in the first stop position (S1z) is predetermined.

22. The computer-implemented method according to claim 12, wherein the conductive surface (30) is a non-anodized aluminum surface.

23. The method according to claim 13, wherein the conductive surface (30) is a non-anodized aluminum surface.

24. A computer-implemented method for controlling an at least one pipetting arm (20) of a liquid handling system (1) for minimizing the dead volume (Vd) in a vial (10) presenting a liquid (L) for aspiration, the automated liquid handling system comprising:

at least one pipetting arm (20) connectable to a pipetting tip (21) and operatively connected to a pressure source for aspirating and dispensing liquids;

a workbench (5) for supporting vials (10) for presenting a liquid (L);

means for liquid level detection;

an operational unit (40) configured to perform a method for minimizing the dead volume (Vd) in the vial (10) presenting the liquid (L) for aspiration, the method comprising:

determining whether the liquid volume (Vi) indicated to be available in the vial (10) is sufficient for a further aspiration step;

if not, moving downward in direction towards the bottom of the vial by means of the pipetting arm (20) presenting a pipetting tip (21) and along the z-axis of the pipetting arm (20) until the pipetting arm (20) comes to a stop in a first stop position (S1z);

storing the first stop position (S1z) of the pipetting arm (20) or correcting the first stop position (S1z) by a predetermined safety measure (Ds) and storing this first safety corrected stop position (S1SCz) of the pipetting arm (20); and further calculating the actual available liquid volume (Va) based on the liquid level known from determining whether the liquid volume (Vi) indicated to be available in the vial (10) is sufficient for a further aspiration step and the first stop position (S1z) or calculating the actual safety corrected available liquid volume (VaSC) based on the liquid level determining whether the liquid volume (Vi) indicated to be available in the vial (10) is sufficient for a further aspiration step and the first safety corrected stop position (S1SCz); and/or detecting the liquid level (LL) of the liquid (L) provided in the vial (10) and calculating the actual available liquid volume (Va) based on the detected liquid level (LL) and the first stop position (S1z) or calculating the actual safety corrected available liquid volume (VaSC) based on the detected liquid level (LL) and the first safety corrected stop position (S1SCz), the method further comprising:

conductively detecting a non-anodized aluminum surface by means of the pipetting arm (20) presenting the pipetting tip (21);

moving the pipetting arm (20) towards the non-anodized aluminum surface and along the z-axis of the pipetting arm (20) until the pipetting arm (20) applies a predetermined force and therefore comes to a stop.

* * * * *